United States Patent
Chen (10) Patent No.: US 10,935,107 B2
(45) Date of Patent: Mar. 2, 2021

(54) DRIVING DEVICE

(71) Applicant: MARK STAR Servo-tech Co., Ltd., Yilan (TW)

(72) Inventor: Chih-Feng Chen, Yilan (TW)

(73) Assignee: MARK STAR SERVO-TECH CO., LTD., Yilan (TW)

( * ) Notice: Subject to any disclaimer, the term of this patent is extended or adjusted under 35 U.S.C. 154(b) by 58 days.

(21) Appl. No.: 16/252,738

(22) Filed: Jan. 21, 2019

(65) Prior Publication Data
US 2020/0233448 A1     Jul. 23, 2020

(51) Int. Cl.
| | |
|---|---|
| *F16H 1/20* | (2006.01) |
| *F16H 57/02* | (2012.01) |
| *G05G 5/12* | (2006.01) |
| *F16D 59/00* | (2006.01) |
| *H02K 7/10* | (2006.01) |
| *G05G 5/16* | (2006.01) |
| *F16H 57/029* | (2012.01) |

(Continued)

(52) U.S. Cl.
CPC ............... *F16H 1/20* (2013.01); *F16D 59/00* (2013.01); *F16H 57/029* (2013.01); *G01D 5/16* (2013.01); *G05G 5/16* (2013.01); *H02K 7/116* (2013.01); *H02K 11/21* (2016.01); *F16D 2127/004* (2013.01); *F16H 2057/02034* (2013.01)

(58) Field of Classification Search
CPC . G05G 5/16; H02K 7/116; H02K 7/12; H02K 11/21; F16D 59/00; F16D 59/02; F16D 2127/004; F16H 1/20; F16H 57/029; F16H 2057/02034; G01D 5/16
See application file for complete search history.

(56) References Cited

U.S. PATENT DOCUMENTS 2,755,396 A * 7/1956 Beardsley ............... F16D 59/02
                                               310/77
3,821,567 A * 6/1974 Erwin .................. H02K 7/1185
                                               310/41

(Continued)

FOREIGN PATENT DOCUMENTS

| DE | 102008040029 A1 * | 2/2009 | ............... H02K 7/12 |
| EP | 3203111 A1 * | 8/2017 | ......... B60H 1/00428 |

(Continued)

*Primary Examiner* — Adam D Rogers
(74) *Attorney, Agent, or Firm* — Leong C. Lei (57) ABSTRACT

A driving device includes: a transmission mechanism; a driving mechanism, moved with the transmission mechanism; a linkage mechanism, moved with the driving mechanism and including a locking unit; and a housing, including an accommodation seat and sealing cover, the accommodation seat accepting the transmission, driving and linkage mechanisms, the sealing cover in combination with the accommodation seat to seal the transmission, driving and linkage mechanisms, one end of the linkage mechanism partly extended out of the sealing seat, and the locking unit partly pressed against an inner side wall of the accommodation seat. Whereby, the transmission mechanism is actuated to drive the driving mechanism to rotate, allowing the driving mechanism to drive the linkage mechanism to rotate; the action of the transmission mechanism is stopped, the locking unit locks the linkage mechanism, thereby capable of preventing power waste and the damage of the transmission mechanism and driving mechanism.

7 Claims, 7 Drawing Sheets

(51) Int. Cl.
    *H02K 7/116*     (2006.01)
    *H02K 11/21*     (2016.01)
    *G01D 5/16*     (2006.01)
    *F16D 127/00*     (2012.01)

(56) References Cited

U.S. PATENT DOCUMENTS

| | | | | |
|---|---|---|---|---|
| 3,845,668 | A * | 11/1974 | Underwood | F16H 1/20 |
| | | | | 74/412 R |
| 9,051,981 | B2 * | 6/2015 | Gitnes | F16D 59/02 |
| 10,099,005 | B2 * | 10/2018 | Gao | A61M 5/142 |
| 10,637,327 | B2 * | 4/2020 | Niekamp | F16H 19/001 |
| 2015/0075923 | A1 * | 3/2015 | Jang | F16D 65/18 |
| | | | | 188/162 |
| 2019/0097496 | A1 * | 3/2019 | Xiong | H02K 7/116 |

FOREIGN PATENT DOCUMENTS

| | | | | |
|---|---|---|---|---|
| WO | WO-2017029124 A1 * | 2/2017 | | F02M 26/54 |
| WO | WO-2018121731 A1 * | 7/2018 | | B25J 9/0021 |

* cited by examiner

DRIVING DEVICE

(a) TECHNICAL FIELD OF THE INVENTION

The present invention relates to a driving device, and more particularly to a driving device, capable of avoiding not only too much power consumption but the damage of a transmission mechanism and driving mechanism when a linkage mechanism is hit.

(b) DESCRIPTION OF THE PRIOR ART

Conventional driving devices (e.g. servo motors) are directly rotated by driving a shaft through a motor and further allowing the shaft to drive required actuating equipment.

However, the shaft is stopped to rotate when the action of the motor of a conventional driving device is stopped, but the motor still needs power to carry out a brake action to the shaft, causing power waste. In addition, the motor will be directly impacted, causing it to be damaged when the shaft is hit.

SUMMARY OF THE INVENTION

The main object of the present invention is to provide a driving device, in which the transmission mechanism is actuated to drive the driving mechanism to rotate, allowing the driving mechanism to drive the linkage mechanism to rotate; the action of the transmission mechanism is stopped, the locking unit locks the linkage mechanism, thereby capable of preventing not only the power waste but the damage of the transmission mechanism and driving mechanism when the linkage mechanism is hit.

To achieve the object mentioned above, the present invention proposes a driving device, including: a transmission mechanism; a driving mechanism, moved with the transmission mechanism; a linkage mechanism, moved with the driving mechanism and including a locking unit; and a housing, including an accommodation seat and sealing cover, the accommodation seat at least accepting the transmission mechanism, driving mechanism and linkage mechanism, the sealing cover in combination with the accommodation seat to seal the transmission mechanism, driving mechanism and linkage mechanism, one end of the linkage mechanism partly extended out of the sealing seat, and the locking unit partly pressed against an inner side wall of the accommodation seat.

According to the driving device mentioned above, the transmission mechanism including a motor and a motor gear configured on one end of the motor, and the motor gear in engagement with the driving mechanism.

According to the driving device mentioned above, the driving mechanism includes a first gear train, second gear train, third gear train and fourth gear train, the first gear train is in engagement with the transmission mechanism at the same time, and the fourth gear train the linkage mechanism at the same time.

According to the driving device mentioned above, the linkage mechanism further includes a gear seat and a rotating shaft configured on the gear seat, and the gear seat is in engagement with the driving mechanism.

According to the driving device mentioned above, the locking unit is configured between the gear seat and rotating shaft, a bottom of the gear seat is configured with a plurality of limiting portion, two sides of each limiting portion respectively have a limiting surface, a bottom of the rotating shaft has a plurality of abutting portions, the abutting portion is respectively positioned at two sides of each limiting portion, the locking unit includes a plurality of rolling columns and a plurality of elastic sheets, the rolling column is respectively positioned at two sides of each limiting portion, the rolling column is pressed against the elastic sheet, and each rolling column is respectively pressed against one end surface of the abutting portion, the limiting surface and an inner side wall of the accommodation seat.

According to the driving device mentioned above, an included angel is formed between one end surface of each abutting portion and an inner side wall of the accommodation seat, and each rolling column is movably positioned at the corresponding included angle.

According to the driving device mentioned above, two ends of the rotating shaft is respectively configured with a bearing.

According to the driving device mentioned above, it further includes an angular position sensing unit configured under the linkage mechanism.

According to the driving device mentioned above, the angular position sensing unit includes a circuit board, sensor and magnetic element, the circuit board is fixed to a bottom of the transmission mechanism, the sensor is configured on the circuit board and positioned under the linkage mechanism, and the magnetic element is configured on a bottom of the linkage mechanism and corresponds to the sensor.

According to the driving device mentioned above, the angular position sensing unit is a variable resistor or disc encoder.

DETAILED DESCRIPTION OF THE PREFERRED EMBODIMENTS

Referring to FIGS. 1 to 7, a driving device of the present invention at least includes a transmission mechanism 1, driving mechanism 2, linkage mechanism 3 and housing 4.

The driving mechanism is moved with the transmission mechanism 1.

The linkage mechanism 3 is moved with the driving mechanism 2, and the linkage mechanism 3 includes a locking unit 31.

The housing 4 includes an accommodation seat 41 and sealing cover 42, where the accommodation seat 41 at least can accept the transmission mechanism 1, driving mechanism 2 and linkage mechanism 3, and the sealing cover 42 is in combination with the accommodation seat 41 to seat the transmission mechanism 1, driving mechanism 2 and linkage mechanism 3, and a plurality of fixing and limiting structures (not shown in the figures) adapted to collocate the transmission mechanism 1, driving mechanism 2 and linkage mechanism 3 are configured inside the accommodation seat 41 and sealing, cover 42; one end of the linkage mechanism 3 is allowed to be partially extended out of the sealing cover 42, and the locking unit 31 pressed against the inner side wall of the accommodation seat 4; the linkage mechanism 3 can be in combination with required actuating equipment (not shown in the figures) through the part of the linkage mechanism 3 extended out of the sealing cover 42 to carry out required transmission.

The transmission mechanism 1 may be powered to allow the running thereof when the present invention is put in use so as to allow the driving mechanism 2 to be rotated through the action of the transmission mechanism 1, thereby allowing the driving mechanism 2 to drive the linkage mechanism 3 to rotate. Furthermore, the linkage mechanism 3 is locked by operating the locking unit 31 in coordination with the inner side wall of the accommodation seat 41 when the transmission mechanism 1 is powered off and stopped, thereby locking the linkage mechanism 3 without needing electric power but through the locking unit 31, capable of preventing the transmission mechanism 1 from still needing the power consumption to brake the driving mechanism 2 and linkage mechanism 3 when the action of the transmission mechanism 1 is stopped.

In addition, the linkage mechanism 3 of the present invention is driven through the driving mechanism 2 by the transmission mechanism 1 so that the linkage mechanism 3 can be prevented from impacting the transmission mechanism 1 directly to cause the transmission mechanism 1 and driving mechanism 2 to be damaged when it is hit.

In a preferred embodiment of the present invention, the transmission mechanism 1 includes a motor 11 and a motor gear 12 configured on one end of the motor 11, where the motor gear 12 is in engagement with the driving mechanism 2. Whereby, the motor 11 can drive the motor gear 12 to move when the transmission mechanism 1 is actuated, the driving mechanism 2 then drives the linkage mechanism 3 to rotate, thereby achieving a power saving effect with the driving of the motor gear 12.

In a preferred embodiment, the driving mechanism 2 includes a first gear train 21, second gear train 22, third gear train 23 and fourth gear train 24 in engagement with each other in sequence, where the first gear train 21 is in engagement with the transmission mechanism 1 at the same time, and the fourth gear train 24 the linkage mechanism 3 at the same time. Whereby, the motor 11 can drive the motor gear 12 when the transmission mechanism 1 is actuated, the motor gear 12 then drives the first gear train 21, second gear train 22, third gear train 23 and fourth gear train 24 in engagement with each other in sequence to rotate simultaneously, the fourth gear train 24 is then used to drive the linkage mechanism 3 to rotate, and the power-saving effect can further be achieved with the driving of the motor gear 12, first gear train 21, second gear train 22, third gear train 23 and fourth gear train 24.

In a preferred embodiment, the linkage mechanism 3 further includes a gear seat 32 and a rotating shaft 33 passed through the center of the gear seat 32, where the gear seat 32 is in engagement with the driving mechanism 2, and a part of one end of the rotating shaft 33 is extended out of the sealing cover 42, thereby to be in engagement with the required equipment (not shown in the figures) to conduct required transmission.

Whereby, the motor 11 drives the motor gear 12 to rotate when the transmission mechanism 1 is actuated, and the motor gear 12 then drives the first gear train 21, the second gear train 22, third gear train 23 and fourth gear train 24 in engagement with each other in sequence to rotate simultaneously. Furthermore, the fourth gear train 24 further drives the gear seat 32 of the linkage mechanism 3 to rotate. At the same time, the gear seat 32 drives the rotating shaft 33. As mentioned above, the driving of not only the motor gear 12, first gear train 21, second gear train 22, third gear train 23, fourth gear train 24 and gear seat 32 can be used to achieve the power saving effect, but the linkage mechanism 3 can be prevented from impacting the transmission mechanism 1 to cause the damage of the transmission 1 and driving mechanism 2 because the motor gear 12, first gear train 21, third gear train 22, third gear train 23, fourth gear train 24 and gear seat 32 are operated in coordination with each other in sequence.

In a preferred embodiment, the locking unit 31 is configured between the gear seat 32 and the rotating shaft 33, the bottom of the gear seat 32 is configured with a plurality of limiting portions 321, the two sides of each of which respectively have a limiting surface 3211, 3211a, the bottom of the rotating shaft 33 has a plurality of abutting portions 331 positioned at the two sides of each limiting portion 321. Furthermore, the locking unit 31 includes a plurality of rolling columns 311 positioned at the two sides of each limiting portion 321 and a plurality of elastic sheets 312, each two rolling columns 311 is pressed against by the elastic sheet 312, and each rolling column 311 is movably pressed against one end surface of the abutting portion 331, the limiting surfaces 3211, 3211a and the inner side wall of the accommodation seat 11. In addition, an included angle a is formed between one end surface of each abutting portion 331 and the inner side wall of the accommodation seat 41, and each rolling column 311 is movably positioned at the included angle a.

Figure 1:
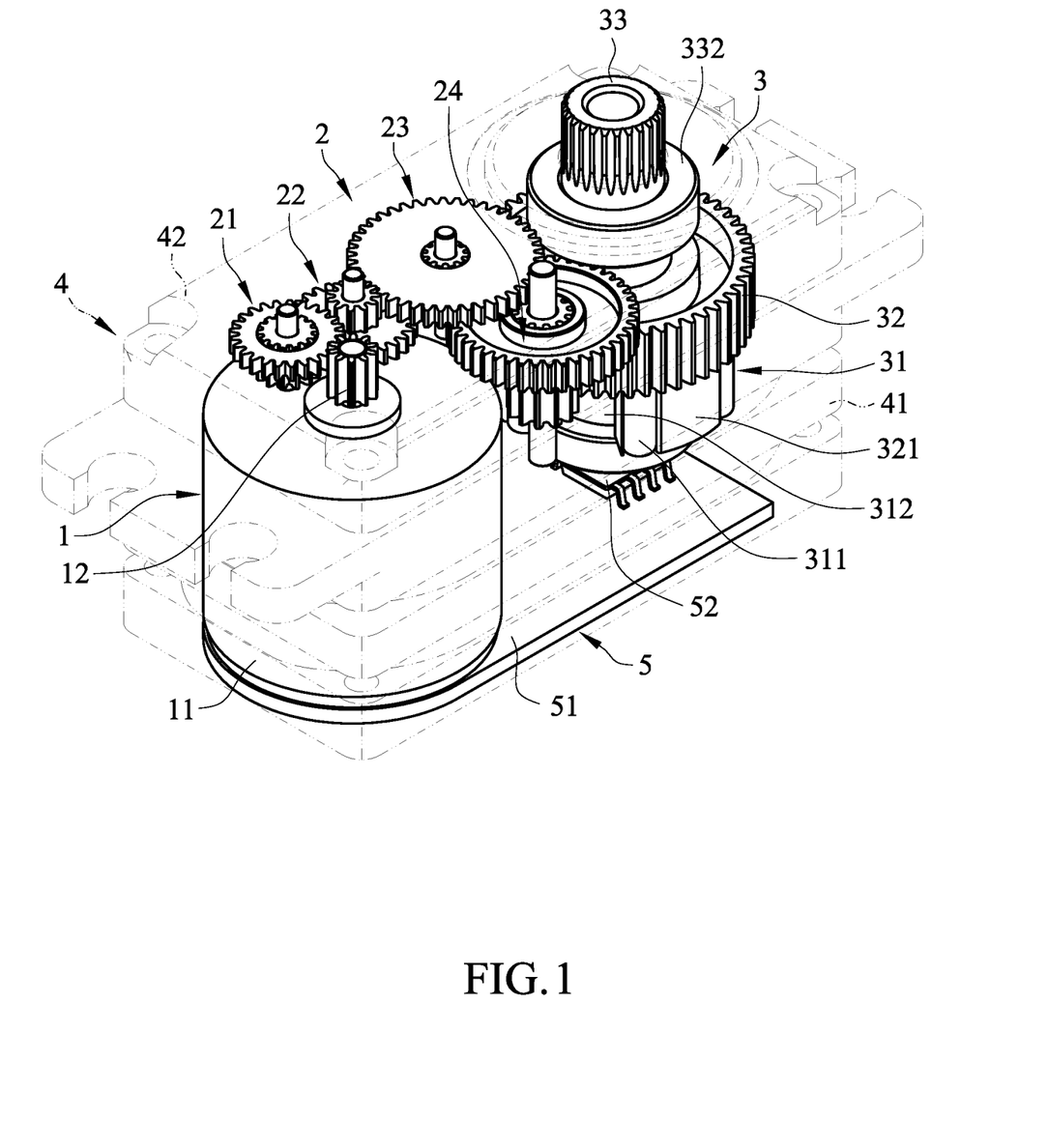
FIG. 1 is a perspective view of the present invention.
Figure 2:
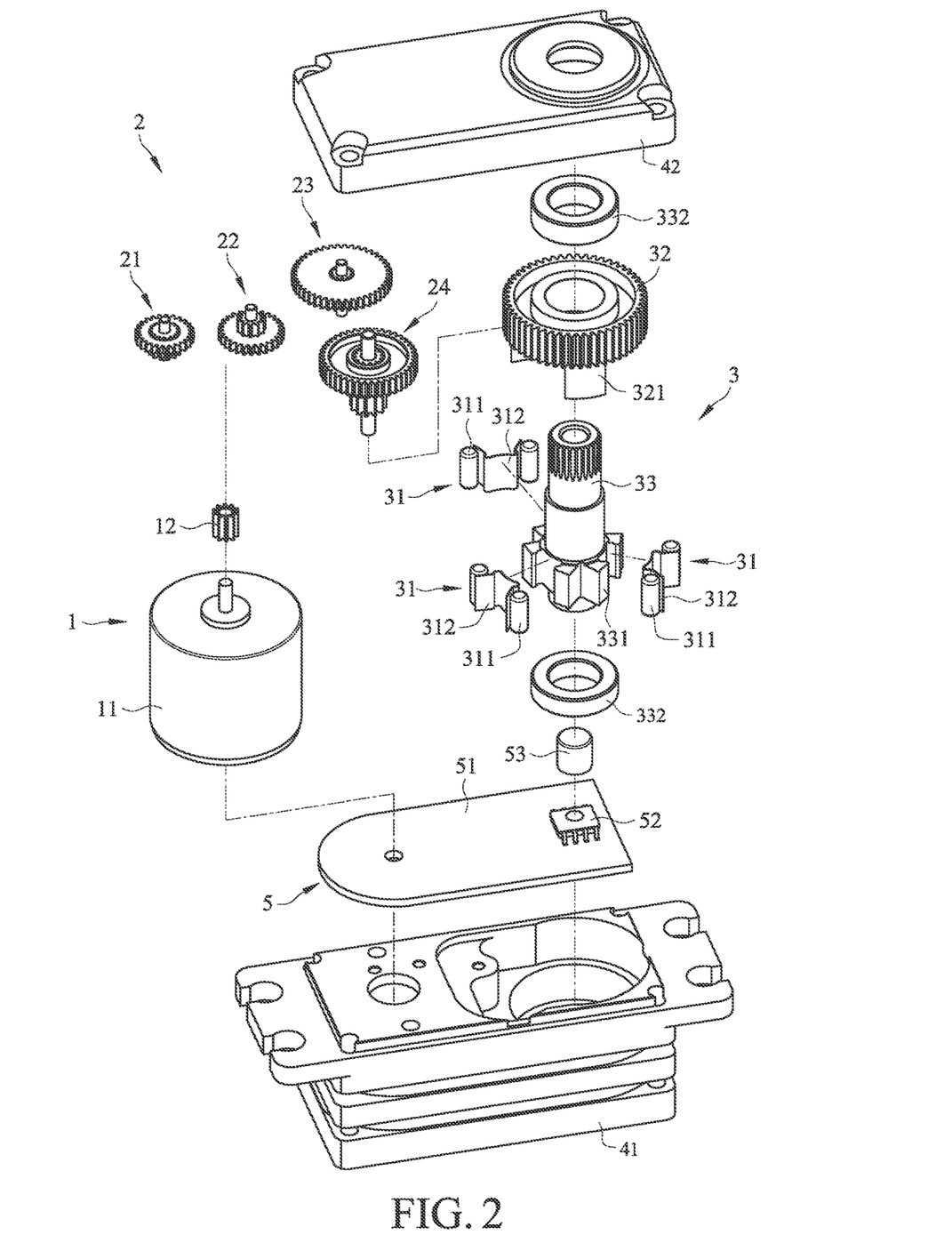
FIGS. 2 and 3 respectively are an exploded view of the present invention.
Figure 3:
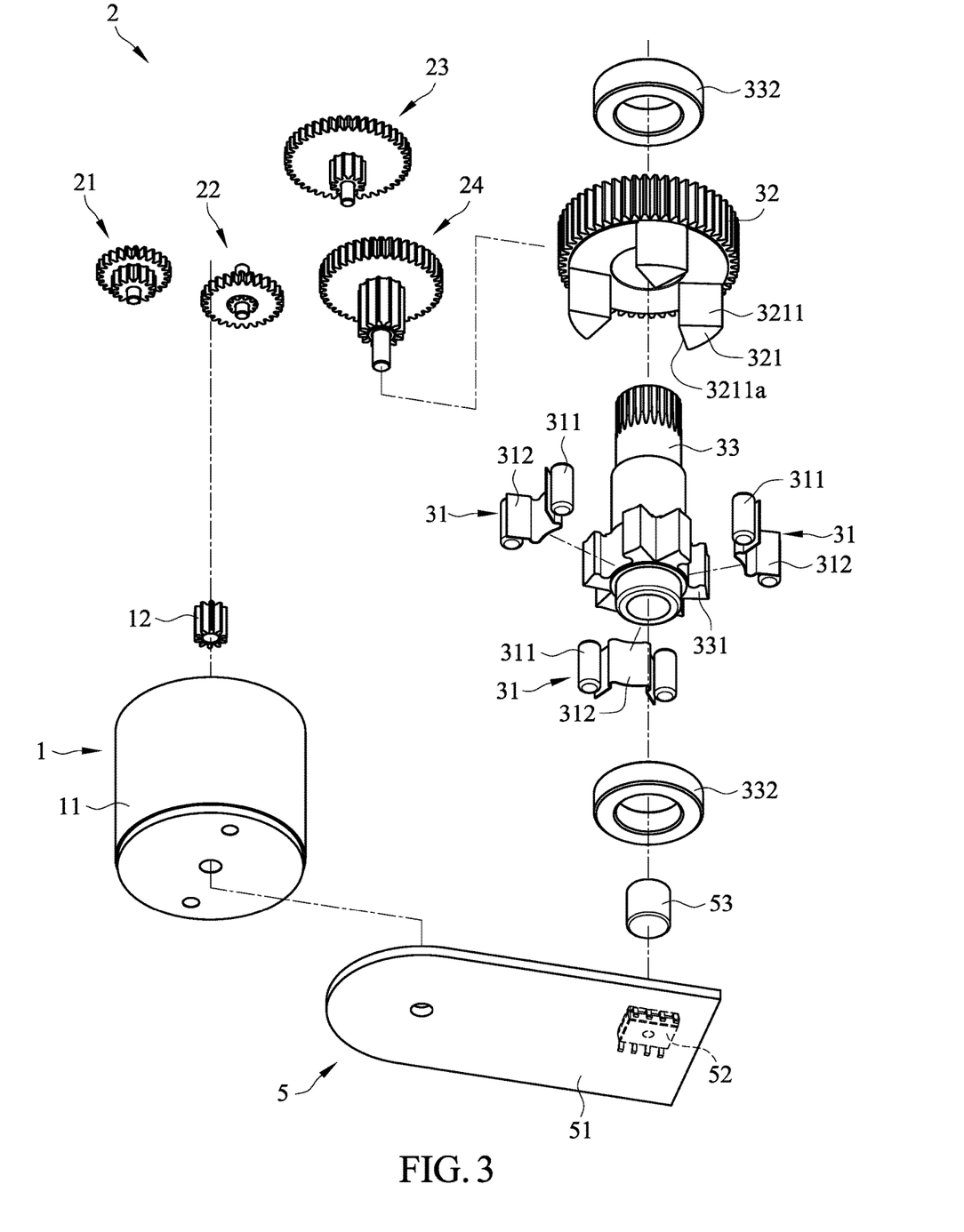
Figure 4:
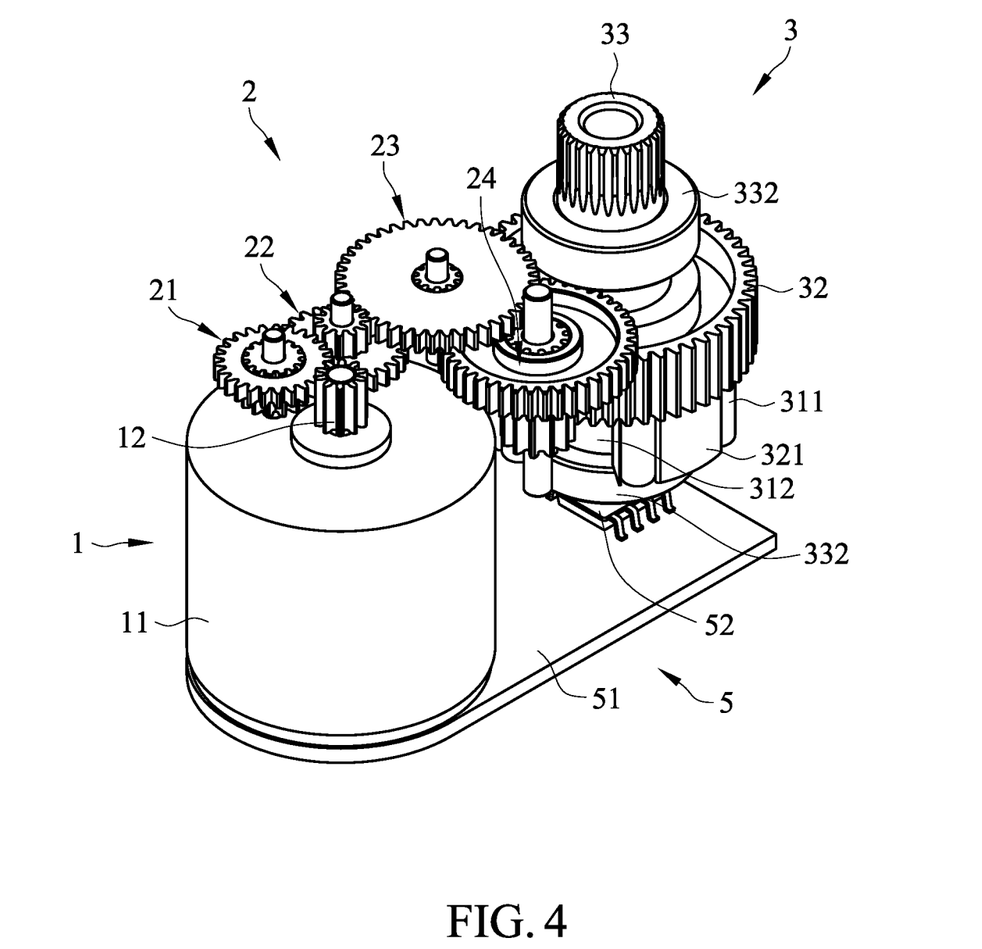
FIGS. 4 and 5 respectively are a perspective view of the present invention including no housing.
Figure 5:
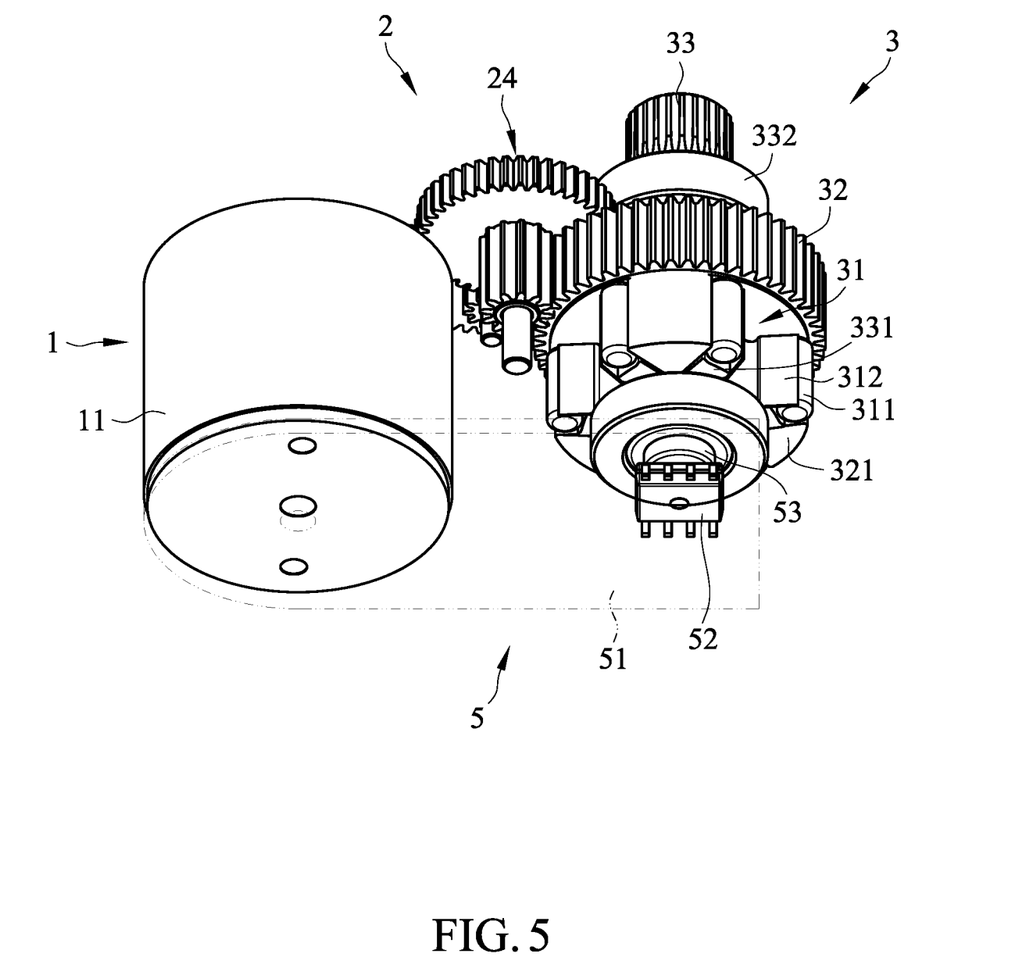
Figure 6:
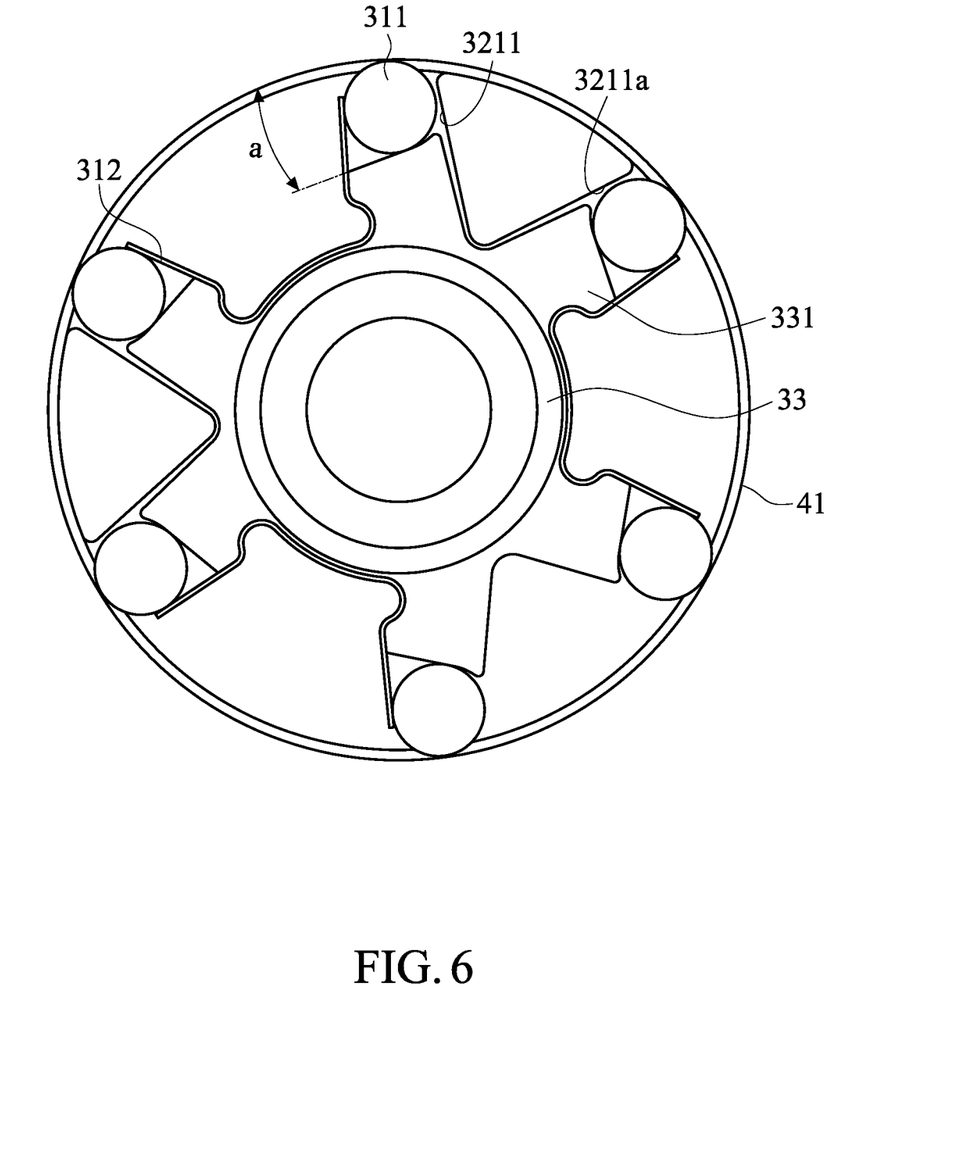
FIG. 6 is a schematic view of a locking unit of the present invention in a locking state.
Figure 7:
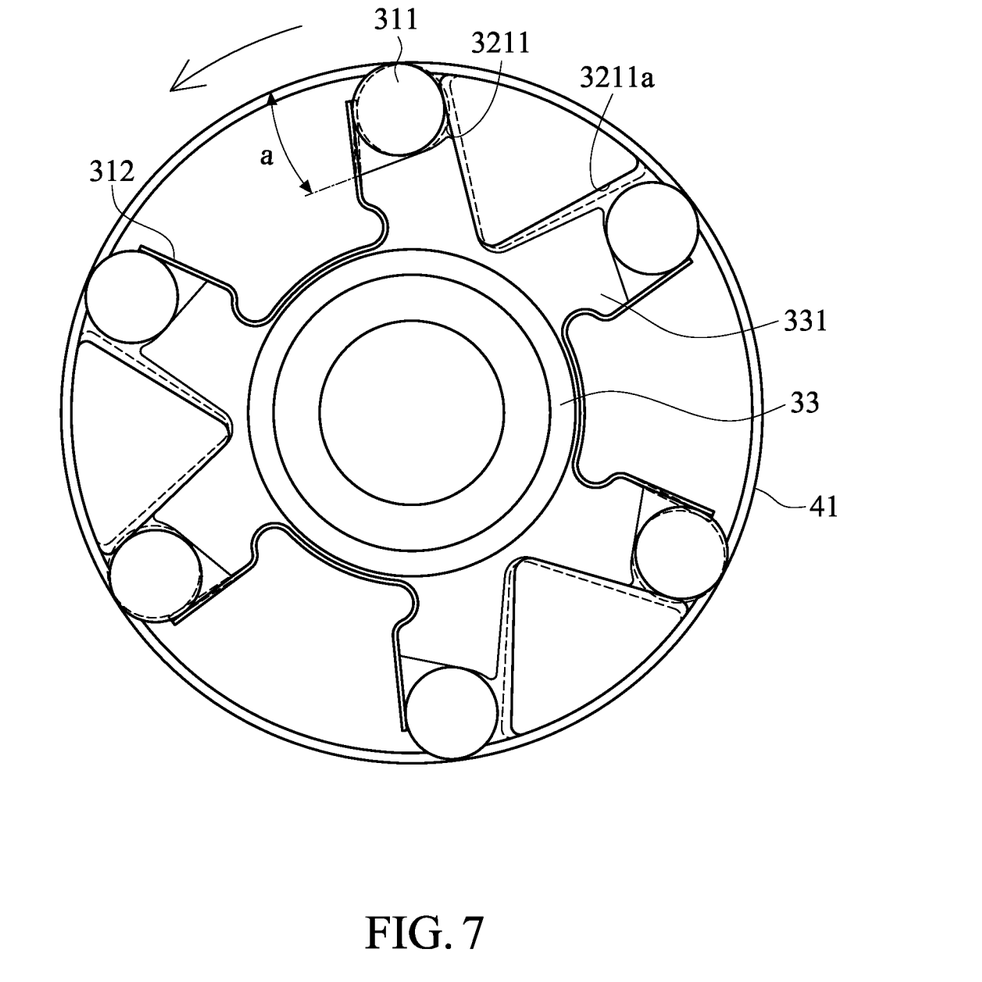
FIG. 7 is a schematic view of the locking unit of the present invention in a releasing state.

Whereby, each elastic sheet 312 of the locking unit 31 is pressed the corresponding rolling column 311 inside the included angle a formed between the corresponding abutting portion 331 and accommodation seat 41, allowing the locking unit 31 to be locked when the linkage mechanism 3 is not rotated as FIG. 6 shows; the limiting surface 3211 of one side of each limiting portion 321 will push the rolling column 311 abutted against it to move, allowing the rolling column 311 to be moved out of the included angle a and each rolling column 311 to compress the corresponding elastic sheet 312 and the limiting surface 3211a on the other side of the limiting portion 321 to be moved away from the rolling column 311 abutted against it to be unlocked when the gear seat 32 is driven by the driving mechanism 2 to rotate as FIG. 7 shows, thereby allowing the gear seat 32 to be rotated to cause the gear seat 32 to drive the rotating shaft 33 to rotate. Furthermore, when the transmission mechanism 1 is powered off and the action thereof is stopped, each elastic sheet 312 pushes the corresponding rolling column 311 into the included angle a due to elastic release because the rotation of the gear seat 32 is stopped, and the rolling column 311 is further caused to be stuck into an end surface of the abutting 331, limiting surface 3211, 3211a and the inner surface of the accommodation seat 41, allowing the locking unit 31 to be locked as FIG. 6 shows. Thus, the linkage mechanism 3 can be locked through the locking unit 31 without needing power, which prevents power from being consumes to brake the driving mechanism 2 and linkage mechanism 3 when the action of the transmission mechanism 1 is stopped.

In a preferred embodiment, the two ends of the rotating shaft 33 are respectively configured with a bearing 332 allowed to be fixed inside the accommodation seat 41. Whereby, the rotating shaft 33 can be run smoothly with the bearings 332.

In a preferred embodiment, the present invention further includes an angular position sensing unit 5 configured under the linkage mechanism 3 and positioned inside the accommodation seat 41, where the angular position sensing unit 5 includes a circuit board 51, sensor 52 and magnetic element 53, where the circuit board 51 is fixed to the bottom of the transmission mechanism 1, the sensor 52 is configured on the circuit board 51 and positioned under the linkage mechanism 3, and the magnetic element 53 is configured on the bottom of the rotating shaft 33 of the linkage mechanism 3 and corresponds to the sensor 52. In the embodiment, the sensor 52 may be a contact sensor or non-contact sensor (e.g. Hall element or angular position sensing element). In addition, the angular position sensing unit 5 may further be a variable resistor or disc encoder (not shown in the figures) inserted in the bottom of the rotating shaft 33 in accordance with the required.

Whereby, when the linkage mechanism 3 is rotated, the magnetic element 53 can be driven to move at the same time, and the sensor 52 receives the magnetic signals of the magnetic element 53 and encode them. Thereafter, the circuit board 51 further transmits encoded signals to related monitoring equipment (not shown in the figures), thereby measuring the rotating angular position of the driving device instantly.

According to the above, the present invention overcome the defects of conventional driving devices; the transmission mechanism is actuated to drive the driving mechanism to rotate, allowing the driving mechanism to drive the linkage mechanism to rotate. Furthermore, the action of the transmission mechanism is stopped, the locking unit locks the linkage mechanism, thereby capable of preventing not only the power waste but the damage of the transmission mechanism and driving mechanism when the linkage mechanism is hit. Indeed, the present invention is more advanced, practical and effective to improve the power demand after installation.

I claim:

1. A driving device, comprising:
   a transmission mechanism;
   a driving mechanism that is rotatably driven by said transmission mechanism;
   a linkage mechanism that is rotatably driven by said driving mechanism and comprising a locking unit; and
   a housing, comprising an accommodation seat and sealing cover, said accommodation seat at least accepting said transmission mechanism, driving mechanism and linkage mechanism, said sealing cover in combination with said accommodation seat to seal said transmission mechanism, driving mechanism and linkage mechanism, one end of said linkage mechanism partly extended out of said sealing cover, and said locking unit partly pressed against an inner side wall of said accommodation seat;
   wherein said linkage mechanism further comprises a gear seat and a rotating shaft configured on said gear seat, and said gear seat is in engagement with said driving mechanism;
   wherein said locking unit is configured between said gear seat and rotating shaft, a bottom of said gear seat is configured with a plurality of limiting portions, two sides of each of said plurality of limiting portions respectively have a limiting surface, a bottom of said rotating shaft has a plurality of abutting portions, each of said plurality of abutting portions is respectively positioned at two sides of each of said plurality of limiting portions, said locking unit comprises a plurality of rolling columns and an elastic sheet, each of said plurality of rolling columns is respectively positioned at two sides of each of said plurality of limiting portions, each of said plurality of rolling columns is pressed against said elastic sheet, and each of said plurality of rolling columns is respectively pressed against one end surface of each of said plurality of abutting portions, said limiting surface of each of said plurality of limiting portions and the inner side wall of said accommodation seat.

2. The device according to claim 1, wherein said transmission mechanism comprising a motor and a motor gear configured on one end of said motor, and said motor gear in engagement with said driving mechanism.

3. The device according to claim 1, wherein said driving mechanism comprises a first gear train, second gear train, third gear train and fourth gear train, said first gear train is in engagement with said transmission mechanism, and said fourth gear train is in engagement with said linkage mechanism.

4. The device according to claim 1, wherein an included angle is formed between the one end surface of each of said plurality of abutting portions and the inner side wall of said accommodation seat, and each said rolling column is movably positioned at said corresponding included angle.

5. The device according to claim 1, wherein two ends of said rotating shaft is respectively configured with a bearing.

6. The device according to claim 1, further comprising an angular position sensing unit configured under said linkage mechanism.

7. The device according to claim 6, wherein said angular position sensing unit comprises a circuit board, sensor and magnetic element, said circuit board is fixed to a bottom of said transmission mechanism, said sensor is configured on said circuit board and positioned under said linkage mechanism, and said magnetic element is configured on a bottom of said linkage mechanism and corresponds to said sensor.

* * * * *